United States Patent
Lange

(10) Patent No.: US 11,828,098 B2
(45) Date of Patent: Nov. 28, 2023

(54) DRIVE DEVICE FOR A WINDOW LIFT, HAVING A BEARING ELEMENT FOR FIXING A STATOR IN A HOUSING

(71) Applicant: BROSE FAHRZEUGTEILE GMBH & CO. KOMMANDITGESELLSCHAFT, WUERZBURG, Wuerzburg (DE)

(72) Inventor: Gabriele Lange, Marktrodach (DE)

(73) Assignee: BROSE FAHRZEUGTEILE GMBH & CO. KOMMANDITGESELLSCHAFT, WUERZBURG, Wuerzburg (DE)

( * ) Notice: Subject to any disclaimer, the term of this patent is extended or adjusted under 35 U.S.C. 154(b) by 1034 days.

(21) Appl. No.: 16/331,023

(22) PCT Filed: Sep. 5, 2017

(86) PCT No.: PCT/EP2017/072147
§ 371 (c)(1),
(2) Date: May 30, 2019

(87) PCT Pub. No.: WO2018/046459
PCT Pub. Date: Mar. 15, 2018

(65) Prior Publication Data
US 2019/0277079 A1 Sep. 12, 2019

(30) Foreign Application Priority Data
Sep. 6, 2016 (DE) .......................... 102016216888.6

(51) Int. Cl.
*H02K 1/18* (2006.01)
*E05F 15/697* (2015.01)
(Continued)

(52) U.S. Cl.
CPC ............ *E05F 15/697* (2015.01); *H02K 1/187* (2013.01); *H02K 5/161* (2013.01); *H02K 7/081* (2013.01);
(Continued)

(58) Field of Classification Search
CPC ...... H02K 7/081; H02K 7/1166; H02K 21/22; H02K 5/161; H02K 1/187; H02K 2205/03
See application file for complete search history.

(56) References Cited

U.S. PATENT DOCUMENTS

| | | |
|---|---|---|
| 2,848,218 A | 8/1958 | Leslie et al. |
| 3,455,174 A | 7/1969 | Pickles |
(Continued)

FOREIGN PATENT DOCUMENTS

| | | |
|---|---|---|
| CN | 102741492 A | 10/2012 |
| CN | 102782239 A | 11/2012 |
(Continued)

*Primary Examiner* — Dang D Le
(74) *Attorney, Agent, or Firm* — Dickinson Wright PLLC

(57) ABSTRACT

A drive device for adjusting a covering element of a vehicle includes an output element for adjusting the covering element; a motor unit that has an electric motor with a stator, a rotor, and an input shaft that is connected to the rotor and is rotatable about a shaft axis for driving the output element; and a drive housing that at least partially encloses the motor unit. The stator is connected via a bearing element to a stationary housing section of the drive housing, wherein the bearing element has a bearing opening in which the input shaft is supported such that it can rotate relative to the stator.

20 Claims, 15 Drawing Sheets

(51) Int. Cl.
  *H02K 5/16* (2006.01)
  *H02K 7/08* (2006.01)
  *H02K 7/116* (2006.01)
  *H02K 21/22* (2006.01)

(52) U.S. Cl.
  CPC ............ *H02K 7/1166* (2013.01); *H02K 21/22* (2013.01); *H02K 2205/03* (2013.01)

(56) References Cited

U.S. PATENT DOCUMENTS

| | | | |
|---|---|---|---|
| 4,428,250 A | 1/1984 | Becker et al. | |
| 4,529,900 A | 7/1985 | Uzuka | |
| 5,977,675 A * | 11/1999 | Oelsch | F16C 35/077 310/90 |
| 6,486,577 B1 * | 11/2002 | Ursel | B60N 2/933 310/90 |
| 7,019,423 B1 * | 3/2006 | Horng | H02K 15/165 310/67 R |
| 8,138,646 B2 * | 3/2012 | Shirai | H02K 7/081 310/90 |
| 9,103,370 B2 * | 8/2015 | Mueller | H02K 7/081 |
| 9,831,728 B2 * | 11/2017 | Kawashima | H02K 23/32 |
| 2009/0039725 A1 | 2/2009 | Kanatani et al. | |

FOREIGN PATENT DOCUMENTS

| | | |
|---|---|---|
| CN | 103534907 A | 1/2014 |
| DE | 9209929 U1 | 9/1992 |
| DE | 10310186 A1 | 9/2004 |
| DE | 102004044863 A1 | 3/2006 |
| DE | 102005028815 A1 | 1/2007 |
| DE | 102006047883 B3 | 10/2007 |
| DE | 112008002124 T5 | 7/2010 |
| DE | 102011005360 A1 | 9/2012 |
| GB | 1393705 A | 5/1975 |
| GB | 2027285 A | 2/1980 |
| JP | H1179627 A | 3/1999 |
| JP | 2010093943 A | 4/2010 |
| WO | 2009020610 A1 | 2/2009 |
| WO | 2014139727 A2 | 9/2014 |

* cited by examiner

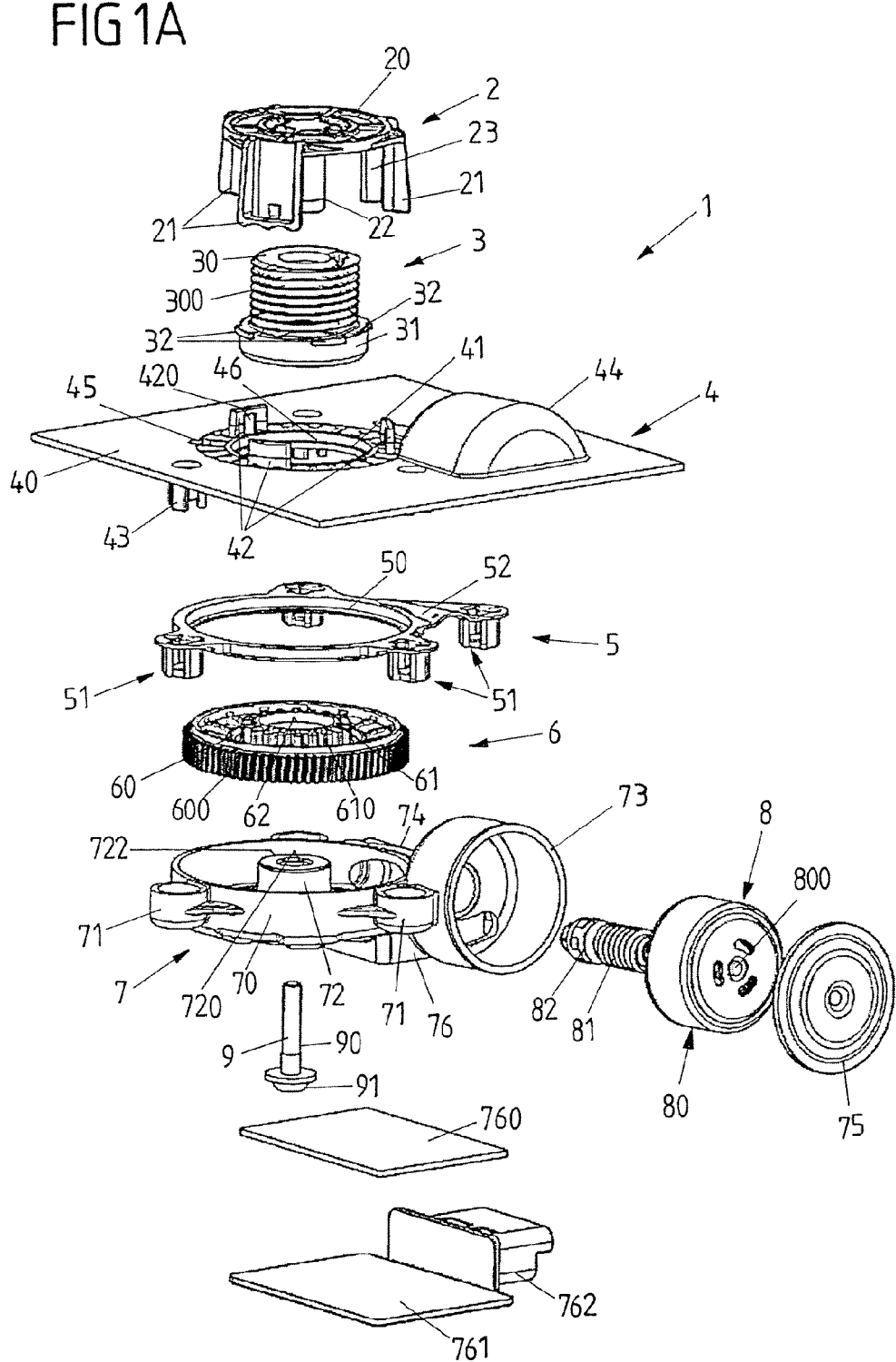

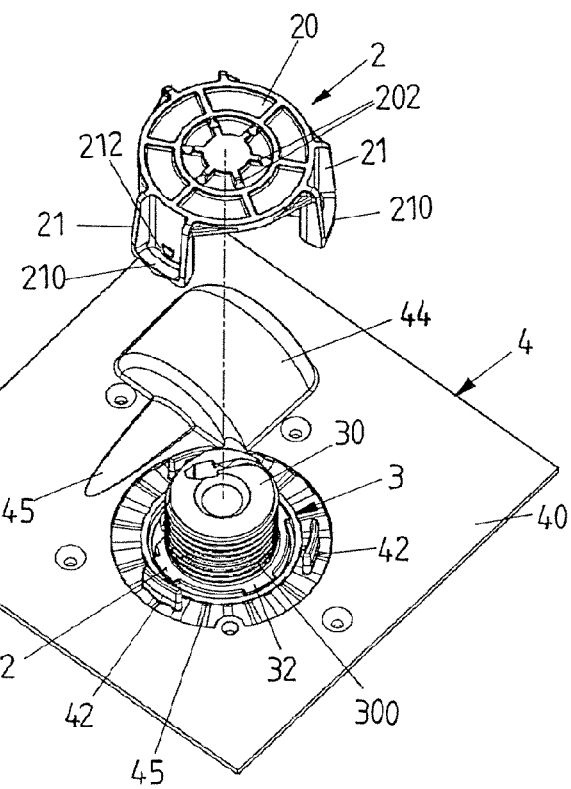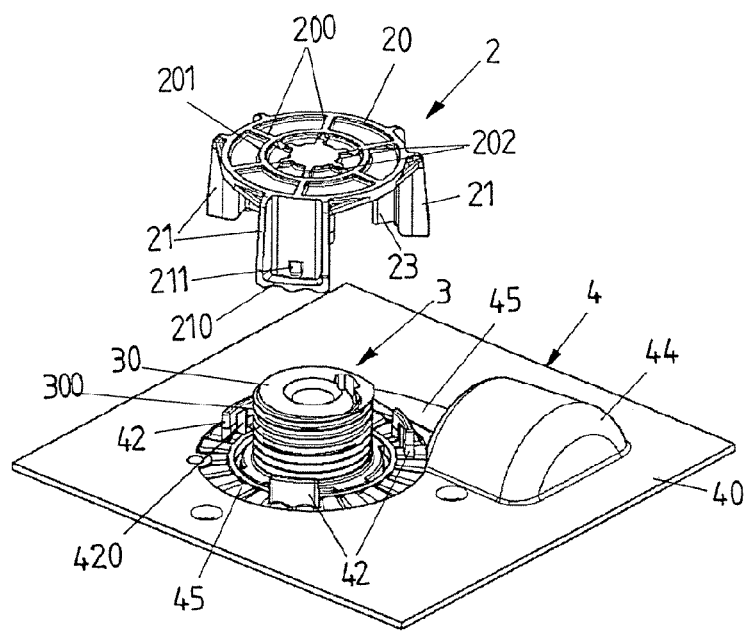

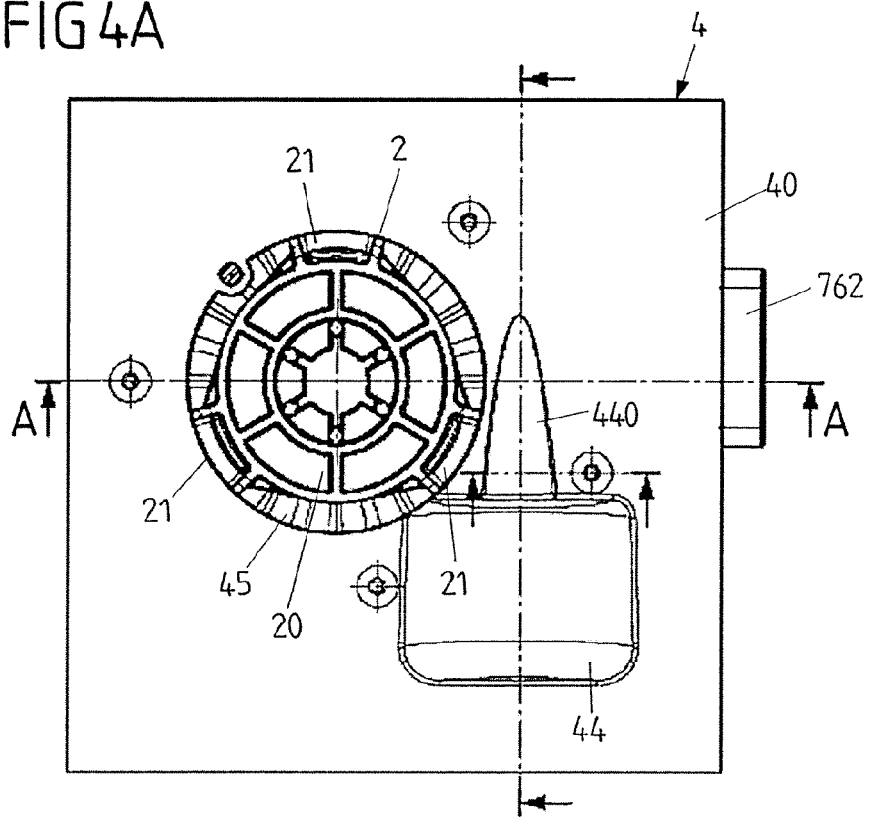
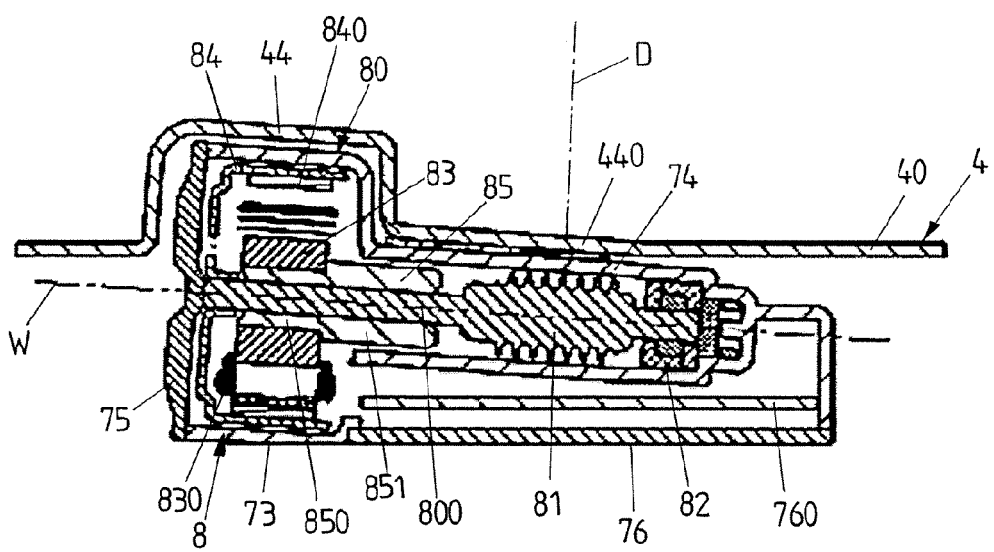

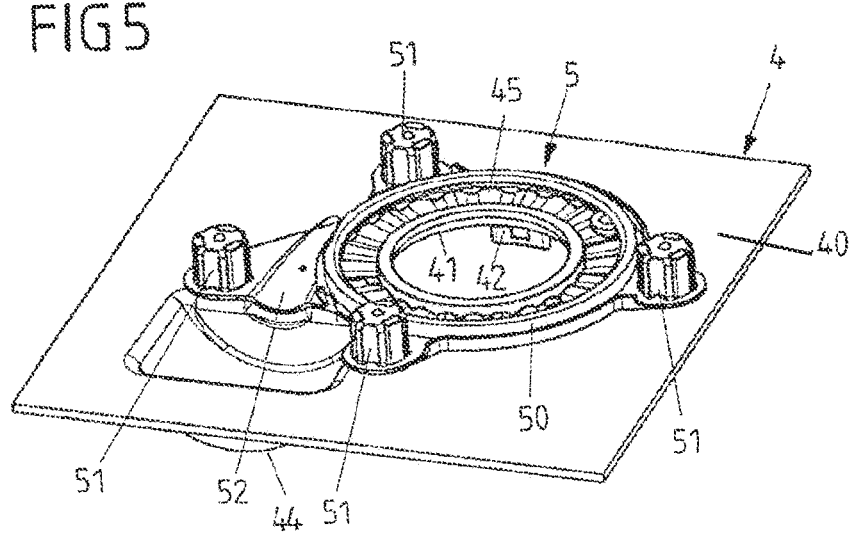
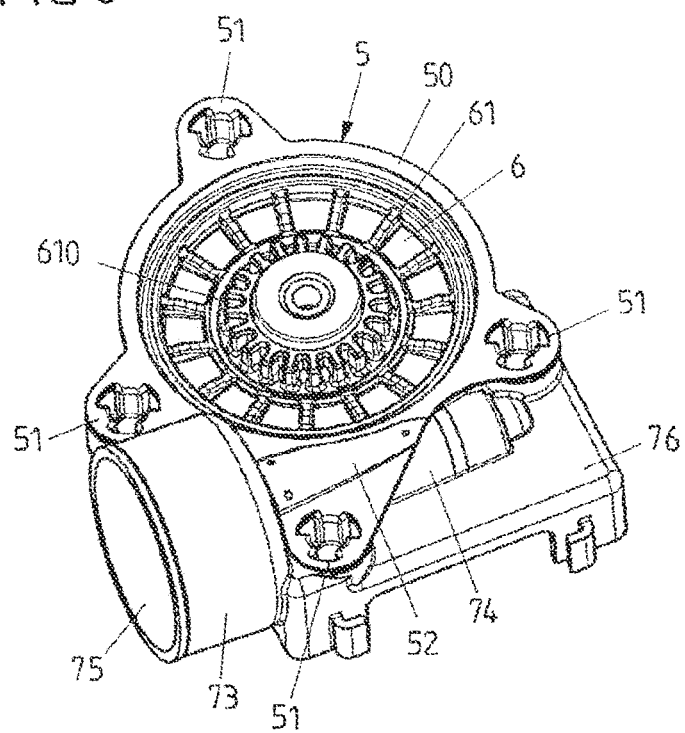

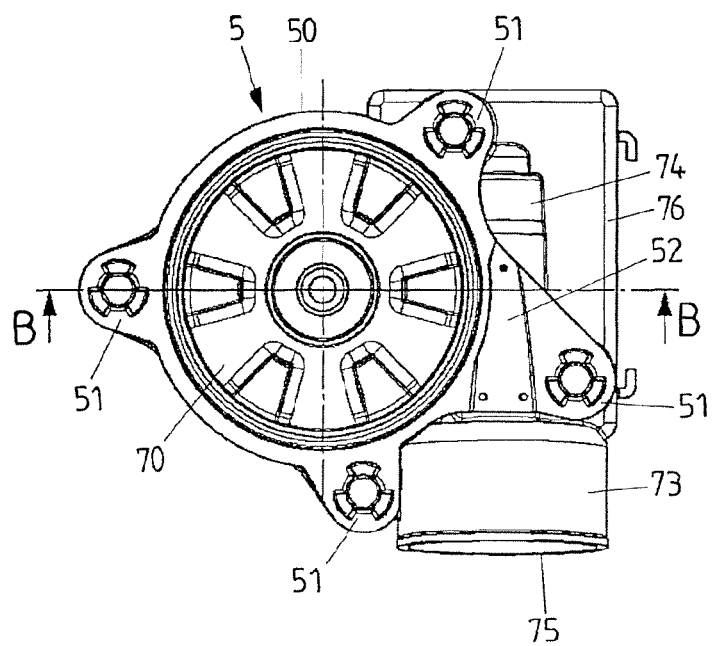
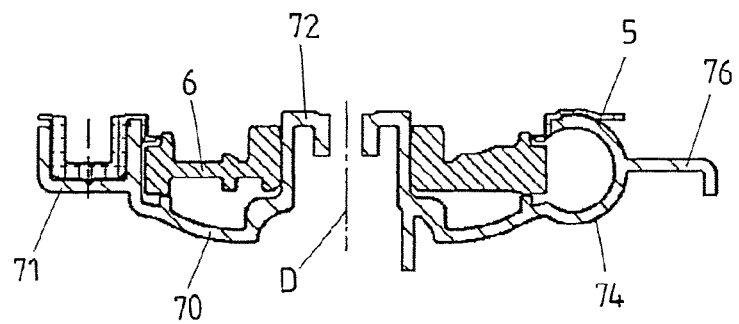

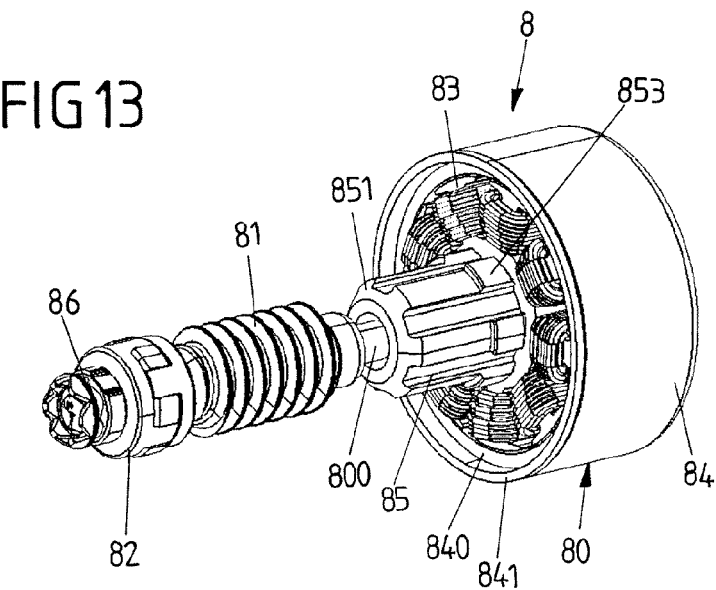
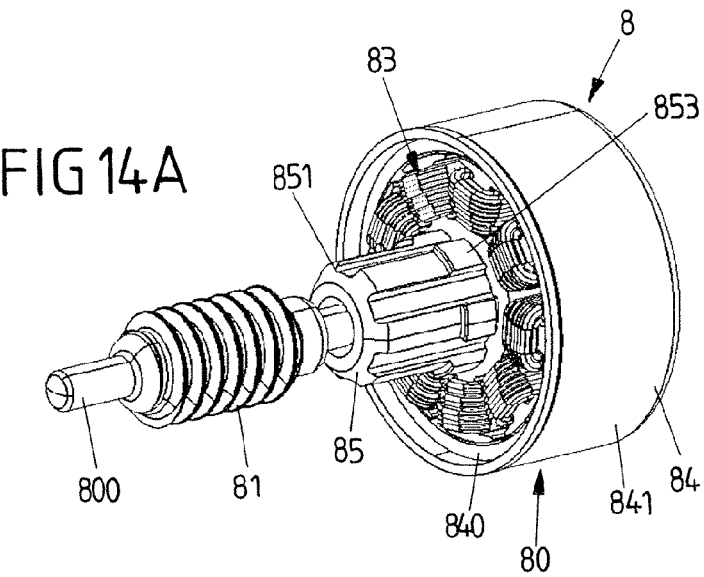
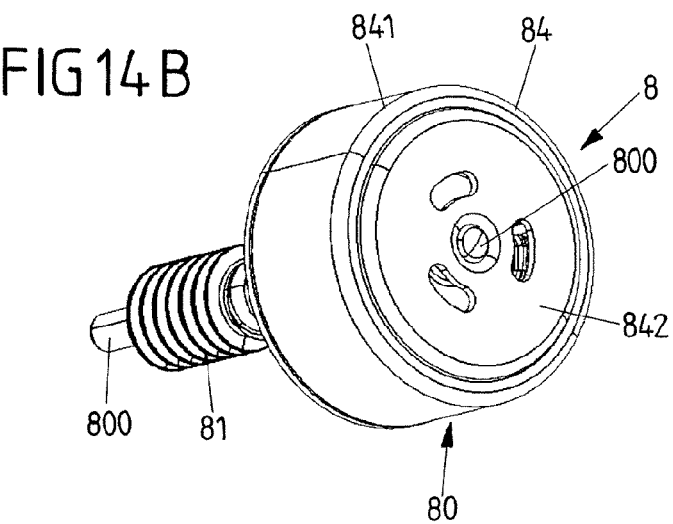

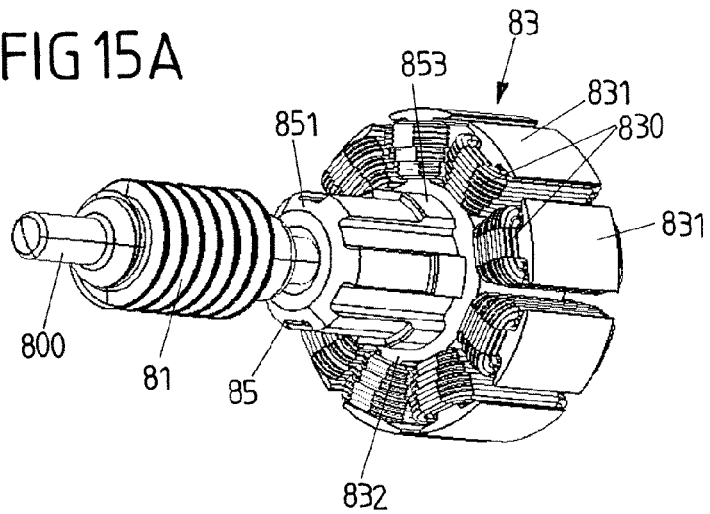
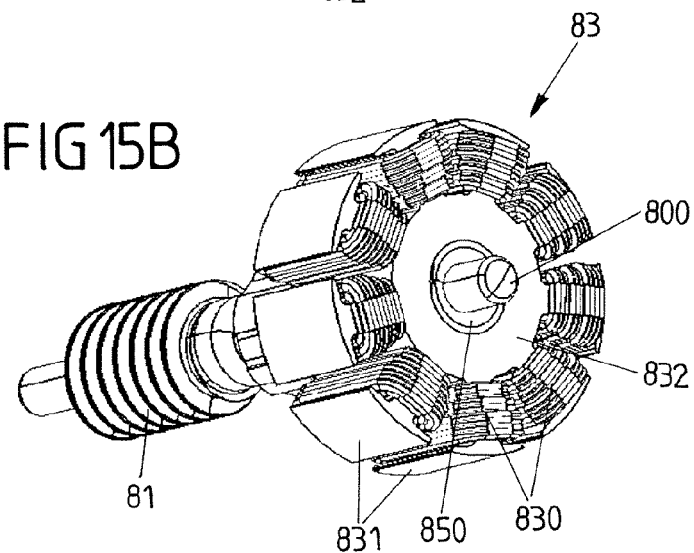
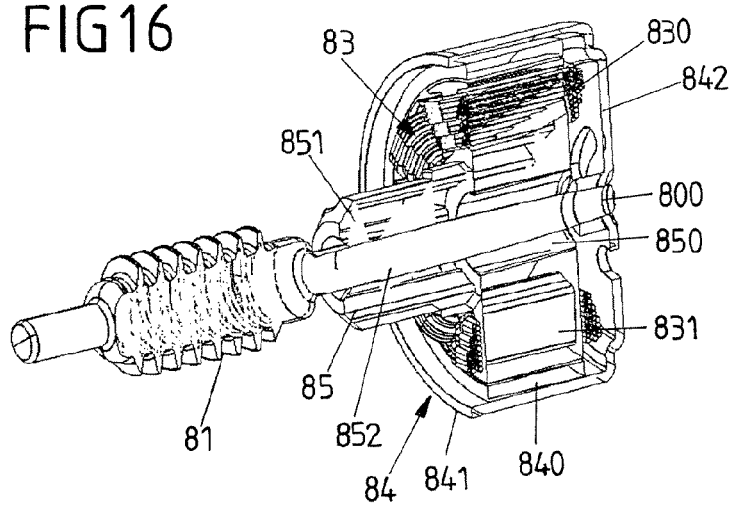

DRIVE DEVICE FOR A WINDOW LIFT, HAVING A BEARING ELEMENT FOR FIXING A STATOR IN A HOUSING

CROSS-REFERENCE TO RELATED APPLICATIONS

This application is the U.S. National Phase of PCT/EP2017/072147 filed Sep. 5, 2017, which claims priority to DE 10 2016 216 888.6 filed Sep. 6, 2016, the disclosures of which are hereby incorporated in their entirety by reference herein.

TECHNICAL FIELD

The present disclosure relates to a drive apparatus for adjusting a covering element of a vehicle, including a window lifter device.

BACKGROUND

A drive apparatus of said type may include an output element for adjusting the covering element, and a motor unit which has an electric motor with a stator, with a rotor and with a drive shaft which is connected to the rotor and which is rotatable about a shaft axis and which serves for driving the output element. The motor unit is at least partially enclosed in a drive housing of the drive apparatus.

The drive apparatus may advantageously be used for adjusting a covering element of a vehicle, in particular for a window lifter device. The covering element may be a window pane, a sliding roof, a loading compartment cover, a tailgate, a sun blind or else a vehicle door for covering an opening or the like in a vehicle.

SUMMARY

According to one or more embodiments, a drive apparatus which can exhibit expedient operating characteristics, provide a sufficient torque and be of compact construction, is provided.

Accordingly, the stator is connected by means of a bearing element to a static housing portion of the drive housing, wherein the bearing element has a bearing opening in which the drive shaft is borne so as to be rotatable relative to the stator.

The bearing element may be used for a dual function. Firstly, the bearing element serves for the fixing of the stator within the drive housing of the drive apparatus. This makes it possible in particular for the electric motor to be designed as an external-rotor motor with a static stator situated centrally at the inside and with a rotor which rotates at the outside around the stator, as will be discussed in more detail below. In a further function the bearing element furthermore serves for bearing the drive shaft, for which purpose the bearing element has a bearing opening in which the drive shaft is borne so as to be rotatable relative to the stator. The bearing element thus provides a bearing for the drive shaft for the rotatable mounting relative to the stator.

The bearing element may for example be manufactured from plastic. The bearing element may in particular have advantageous sliding characteristics for the bearing of the drive shaft.

In one embodiment, the bearing element has a first shank portion which is connected fixedly to a stator body of the stator. A second shank portion which is offset axially relative to the first shank portion is, by contrast, connected fixedly to the housing portion, such that the bearing element creates a fixed connection of the stator to the housing portion.

In one embodiment, the rotor is formed as an external rotor which rotates radially outside the stator in relation to the shaft axis. The electric motor of the motor unit is thus realized as an external-rotor motor. In the case of such an external-rotor motor, the static stator is arranged radially within the rotating rotor. The rotor thus rotates around the stator, which makes it possible for the rotor to be formed with a relatively large diameter, which can yield an expedient torque characteristic of the electric motor.

In general, the torque of the electric motor increases with greater diameter. Thus, if the diameter of the rotor is increased, this can while achieving the same torque be used to reduce the structural size of the electric motor in another direction, in particular in an axial direction, such that the axial length of the electric motor and also of the drive shaft can be reduced.

The electric motor may be designed in particular as a brushless DC motor. In the case of such a brushless DC motor, the stator normally has, on a stator body, a multiplicity of pole teeth on which a multiplicity of stator windings is arranged. For example, such stator windings may be wound as concentrated windings on the pole teeth. It is however also conceivable and possible for so-called wave windings to be used. On each pole tooth, 35 there may be arranged one or more windings, wherein each winding is composed of multiple turns which are formed by a winding wire wound around the associated pole tooth. During operation, the stator windings are electrically energized in an electronically commutated manner such that, for example, three electrical current phases are applied to the windings, resulting in a rotating field at the stator.

In the case of a brushless DC motor, the rotor has a magnet arrangement with a multiplicity of permanent magnet poles. The magnet arrangement may for example be formed by discrete permanent magnets. It is however also conceivable and possible to use an annular magnet which has a multiplicity of alternately magnetized magnet poles which are offset relative to one another circumferentially about the shaft axis. For example, bonded or sintered neodymium magnet arrangements may be used. Also conceivable and possible, however, is a magnet arrangement using cerium (element symbol Ce) as a (permanently) magnetic material. Owing to the magnet arrangement, a magnetic exciter field is formed at the rotor, which exciter field interacts, during the operation of the electric motor, with the rotating field of the stator for the purposes of generating torque at the rotor.

In an exemplary embodiment, the stator may have nine pole teeth with stator windings arranged thereon. The rotor may for example have a magnet arrangement with six (permanent) magnet poles (three magnet pole pairs). Through the use of a brushless DC motor, the structural form of the drive apparatus can be further reduced while maintaining expedient operating and torque characteristics.

In one embodiment, the rotor has a pole pot, which is manufactured for example from a ferromagnetic material and which can thus provide a magnetic return for the magnet arrangement arranged on the rotor. The rotor is connected to the drive shaft and bears the magnet arrangement, wherein the magnet arrangement is arranged for example as an annular magnet within the pole pot.

The output element may be operatively connected to a drive gear which is in meshing engagement with the drive shaft. Here, the drive shaft may for example bear a drive worm, which has a worm toothing which is in meshing engagement with an external toothing of the drive gear. By rotation of the drive shaft, and, in association therewith, by rotation of the drive worm, the drive gear can thus be rotated, and via this the output element can be driven.

The rotor, in particular the pole pot of the rotor, may be connected to the drive shaft on a side of the stator averted from the drive worm. The pole pot of the rotor which rotates around the stator at the outside thus engages around the stator at a side averted from the drive worm, which makes it possible for the stator to be connected by means of the bearing element to the drive housing at a side facing toward the drive worm, and for the drive shaft to be mounted by means of the bearing element in close spatial proximity to the drive worm.

The drive housing may include a worm housing in which the drive worm is enclosed. The worm housing may have a cylindrical form with a substantially constant diameter along its axial length, such that the drive worm is rotatably held in the worm housing.

In one embodiment, the worm housing forms that housing portion to which the bearing element is connected. For this purpose, the bearing element for example engages into the worm housing and is fixedly connected to the worm housing, for example by virtue of the bearing element being pressed into the worm housing. It is additionally or alternatively conceivable and possible for the bearing element to be adhesively bonded or welded to the worm housing or fixed in some other way to the worm housing.

The bearing element is furthermore fixedly connected to the stator body of the stator. For this purpose, the bearing element may be pressed onto, welded to, adhesively bonded to or fixed in some other way to the stator body.

If it is the intention for the bearing element to be pressed together with the worm housing, then the bearing element is pressed into the worm housing with an interference fit. In order to define the axial position of the bearing element in the worm housing, it is possible here for a shoulder to be provided on the worm housing, with which shoulder the bearing element comes into contact, for example by way of a suitable stop, as it is inserted (pressed) into the worm housing, such that the bearing element is, in the connected state, supported axially on the worm housing.

Even in the case of the bearing element being connected in some other way to the worm 30 housing, the bearing element may assume a defined position relative to the worm housing by means of a shoulder on the worm housing.

The bearing element serves for bearing the drive shaft and may be axially of relatively elongate form, such that an expedient mounting for the drive shaft in the drive housing is created by means of the bearing element. Additionally, the drive shaft may be mounted in the worm housing by means of a second bearing element which is axially offset relative to the bearing element, wherein said further, second bearing element is for example arranged at an end of the drive shaft averted from the stator and thus serves for bearing the drive shaft relative to the worm housing at an end averted from the stator. The further, second bearing element may in this case be of bushing-like design and may have the same outer diameter as the shank portion, which engages into the worm housing, of the first bearing element, such that both the first bearing element and the further, second bearing element can for example assume an interference fit in the worm housing. The same outer diameter of the first bearing element and of the further, second bearing element in the case of an inner diameter which is constant over the length of the worm housing may yield advantages with regard to the tolerance conditions, because the bearing elements are subject to similar tolerances in their seat.

The further, second bearing element may also be supported axially on a further, second shoulder of the worm housing. The further bearing element thus also assumes a defined axial position in the worm housing.

For the axial support of the drive shaft, it is for example possible for an abutment element to be provided in the worm housing, on which abutment element the drive shaft is supported axially at one end (averted from the stator). The abutment element lies for example in an end portion of the worm housing, which may have a reduced inner diameter in relation to that portion of the worm housing which accommodates the drive worm.

At its end which engages through the first bearing element, the drive shaft may, by contrast, be supported axially on a cover of a motor pot which encloses the rotor and the stator, wherein, for this purpose, an abutment point may be formed on the cover, which abutment point creates an axial bearing for the drive shaft.

In one embodiment, the shaft axis of the drive shaft may be oriented at an oblique angle relative to an axis of rotation about which the output element is rotatable. In the case of a conventional drive apparatus for a window lifter, such as is known for example from DE 10 2004 044 863 A1, the shaft axis of the drive shaft extends transversely with respect to the axis of rotation of the output element (in the form of a cable drum). This arrangement of the drive shaft relative to the output element restricts the possibilities for the positioning of the motor unit of the drive apparatus on a carrier element, such that the available structural space is significantly predefined in this way. By contrast to this prior art, provision may be made for the shaft axis of the drive shaft to be oriented at an oblique angle relative to the axis of rotation of the output element. Whereas, conventionally, the shaft axis has an angle of 90° to the axis of rotation of the output element, it is now the case that the shaft axis of the drive shaft extends at an oblique angle, that is to say at an angle of <90°, for example at an angle in a range between 85° and 65°, for example between 80° and 70°, relative to the axis of rotation. This provides an additional degree of freedom because this makes it possible for the motor unit to be adapted in terms of its position relative to other components of the drive apparatus, such that an available structural space can be efficiently utilized.

This may also make it possible for the diameter of the rotor to be (further) increased. By increasing the diameter, the axial length of the motor unit and also the axial length of the drive shaft can, maintaining the same available torque, be reduced, which can additionally contribute to a compact structural form of the drive apparatus.

By virtue of the shaft axis of the drive shaft being set obliquely relative to the axis of rotation of the output element, which may correspond to the axis of rotation of the drive gear, the drive worm can also extend obliquely relative to the axis of rotation and thus obliquely relative to the drive gear. In one advantageous embodiment, the obliquity of the shaft axis may in this case be selected specifically such that the pitch angle of the worm toothing corresponds to the angle between the shaft axis and a transverse axis extending transversely (at an angle of 90°) relative to the axis of rotation. This makes it possible for the toothing of the drive gear to be formed as a straight toothing, which permits an expedient structural form of the drive gear while maintaining simple, inexpensive production.

The pitch of a worm toothing is generally understood to mean the axial stroke per unit of circumferential length. The pitch may for example be determined on the basis of the axial stroke per revolution, divided by the circumferential length per revolution (defined by the distance obtained if one linearly unrolls the worm over one revolution). The pitch angle is determined directly from the pitch.

The output element may for example be a cable drum which is rotatable about an axis of rotation and which serves for adjusting a traction element which is operatively connected to the covering element and which is arranged at a first side of a carrier element, wherein the drive housing is arranged on a second side, averted from the first side, of the carrier element. By rotating the cable drums, the traction element can be moved in order to thereby move the covering element for adjustment, for example a window pane. The cable drum is in this case normally arranged in the wet space for example of a vehicle door, whereas the motor unit is fastened on the other side of the carrier element in a dry space. The carrier element provides, in this case, a wet-dry space separation.

BRIEF DESCRIPTION OF THE DRAWINGS

The concept on which the invention is based will be discussed in more detail below on the basis of the exemplary embodiments illustrated in the Figures, in which:

FIG. 1A shows an exploded view of an exemplary embodiment of a drive apparatus;

FIG. 2 shows a view of a cable exit housing before mounting onto a carrier element;

FIG. 3 shows another view of the cable exit housing before mounting onto the carrier element;

FIG. 4A shows a plan view of the carrier element at a first side facing toward the cable exit housing;

FIG. 4B shows a sectional view along the line A-A as per FIG. 4A;

FIG. 5 shows a perspective view of the carrier element at a second side facing toward a drive housing;

FIG. 6 shows a separate perspective view of the drive housing;

FIG. 7A shows a plan view of the drive housing;

FIG. 7B shows a sectional view along the line B-B as per FIG. 7A;

FIG. 13 shows a view of an exemplary embodiment of a motor unit;

FIG. 14A shows a view of the motor unit without a bearing element which serves for bearing a drive shaft at an end side;

FIG. 14B shows another perspective view of the arrangement as per FIG. 14A;

FIG. 15A shows a view of the motor unit without rotor;

FIG. 15B shows another perspective view of the arrangement as per FIG. 15A;

FIG. 16 shows a partially sectional view of the motor unit;

DETAILED DESCRIPTION

Figure 1B:
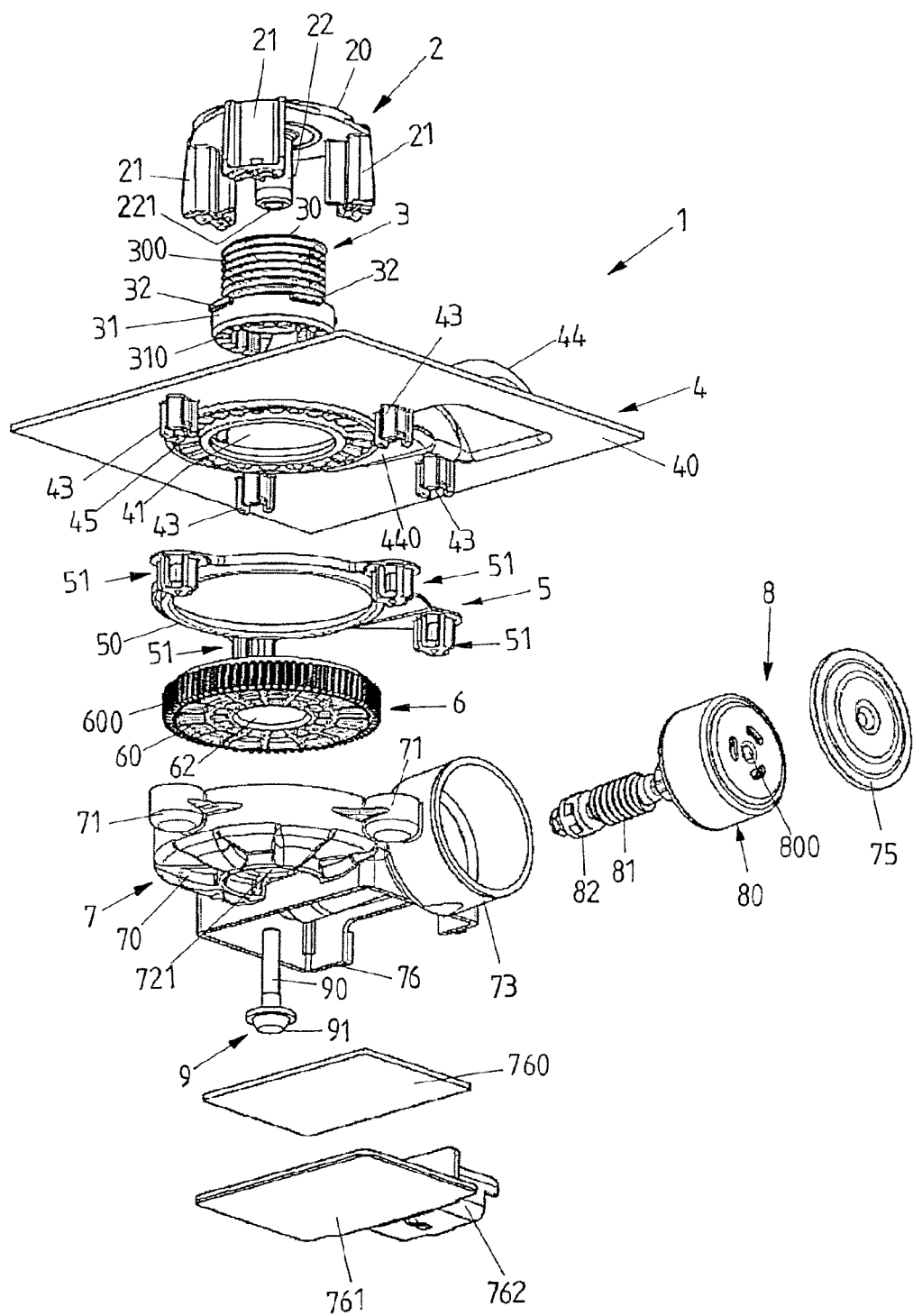
FIG. 1B shows the exploded view as per FIG. 1A, from a different perspective.

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the case of a window lifter, it is for example possible for one or more guide rails to be arranged on an assembly carrier of a door module, on which guide rails there is guided in each case one driver which is coupled to a window pane. The driver may be coupled by a flexible traction element (for example a traction cable), which is designed for transmitting tensile forces, to the drive apparatus, wherein the traction element is arranged on an output element in the form of a cable drum such that, during a rotational movement of the cable drum, the traction element is, with one end, wound onto the cable drum and is, with another end, unwound from the cable drum. A displacement of a cable loop formed by the traction cable thus occurs, together with a corresponding movement of the driver along the respectively associated guide rail. Driven by the drive apparatus, the window pane can thus be adjusted, for example in order to open or close a window opening on a vehicle side door.

In the case of a drive known from DE 10 2004 044 863 A1 for an adjusting device in a motor vehicle, a cable drum is arranged on a bearing dome of a drive housing, wherein the drive housing may be connected by a fastening element in the form of a screw to a carrier element in the form of an assembly carrier.

A drive apparatus for a window lifter, which is for example to be installed on a carrier element in the form of an assembly carrier of a door module on a vehicle side door and which is thus to be enclosed within a vehicle side door, should exhibit advantageous operating characteristics, in particular smooth running characteristics with little excitation of vibrations on the carrier element, and should furthermore efficiently utilize the available structural space. Here, there is a demand for the drive apparatus to be of compact design, wherein the drive apparatus must however provide a torque sufficient to ensure a reliable adjustment of the adjustable part for adjustment, for example of the window pane, possibly even in the case of resistances to movement in the system, for example for the run-in into a seal or the like. In general, the available torque is in this case also dependent on the structural size of the electric motor. That is to say, an electric motor with a larger rotor diameter and/or a larger rotor length can provide a greater torque.

FIGS. 1A, 1B to 7A, 7B show an exemplary embodiment of a drive apparatus 1, which may be used for example as a drive in an adjusting device for adjusting a window pane, for example of a vehicle side door.

Figure 12:
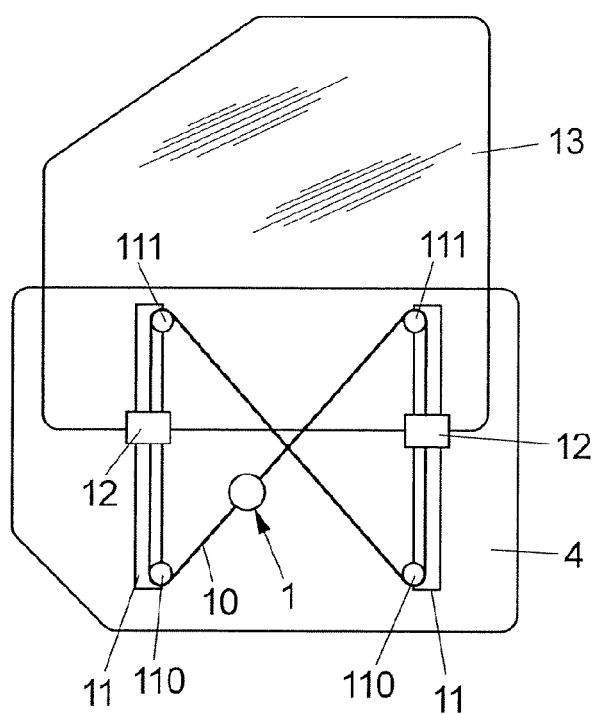
FIG. 12 shows a schematic view of an adjusting device of a vehicle in the form of a window lifter.

An adjusting device of said type in the form of a window lifter, illustrated by way of example in FIG. 12, has for example a pair of guide rails 11, on which in each case one driver 12, which is coupled to a window pane 13, is adjustable. Each driver 12 may be coupled by a traction cable 10, which is designed for transmitting (exclusively) tensile forces, to a drive apparatus 1, wherein the traction cable 10 forms a closed cable loop and, for this purpose, is connected by way of its ends to an output element in the form of a cable drum 3 (see, for example FIGS. 1A and 1B) of the drive apparatus 1. The traction cable 10 extends from the drive apparatus 1, around diverting rollers 110 at the lower ends of the guide rails 11, to the drivers 12, and from the drivers 12, around diverting rollers 111 at the upper ends of the guide rails 11, back to the drive apparatus 1.

During operation, a motor unit of the drive apparatus 1 drives the cable drum 3 such that the traction cable 10 is, with one end, wound onto the cable drum 3 and is, with the other end, unwound from the cable drum 3. The cable loop formed by the traction cable 10 is thus displaced without a change in the freely extending cable length, which has the effect that the drivers 12 are moved in the same direction on the guide rails 11, and the window pane 13 is thus adjusted along the guide rails 11.

In the exemplary embodiment as per FIG. 12, the window lifter is arranged on an assembly carrier 4 of a door module. The assembly carrier 4 may for example be provided for being fixed on a door inner panel of a vehicle door, and constitutes a preassembled unit which, preassembled with the window lifter arranged on the assembly carrier 4, can be mounted on the vehicle door.

The drive apparatus 1 of the exemplary embodiment as per FIGS. 1A, 1B to 7A, 7B is arranged on a surface portion 40 of a carrier element 4, which is realized for example by an assembly carrier of a door module, and said drive apparatus has a cable exit housing 2 arranged on a first side of the carrier element 4 and has a drive housing 7 arranged on a second side, averted from the first side, of the carrier element 4. The cable exit housing 2 serves for bearing the cable drum 3 on the carrier element 4, whereas the drive housing 7 encloses inter alia a drive gear 6, which can be driven by a motor unit 8 and which is connected to the cable drum 3 such that the cable drum 3 can be driven by rotation of the drive gear 6.

The cable drum 3 on the first side of the carrier element 4 is, when arranged as intended for example on a vehicle door of a vehicle, arranged in a wet space of the vehicle door. By contrast, the drive housing 7 is situated in the dry space of the vehicle door. The separation between wet space and dry space may be produced by the carrier element 4, and it is correspondingly necessary for the interface between the drive gear 6 and the cable drum 3 to be sealed off in moisture-tight fashion, such that no moisture can pass from the wet space into the dry space.

The cable exit housing 2 has a base 20, a cylindrical bearing element 22 which protrudes centrally from the base 20 and which is in the form of a bearing dome, and housing portions 21 which are radially spaced apart from the bearing element 22 and which are in the form of housing webs extending parallel to the cylindrical bearing element 22. The cable drum 3 is borne rotatably on the bearing element 22 and, here, is enclosed by the cable exit housing 2 such that the cable drum 3 is held on the carrier element 4.

The cable drum 3 has a body 30 and, on the circumferential shell surface of the body 30, a cable groove 300 which is formed into the body 30 and which serves for receiving the traction cable 10. With an internal gear 31, the cable drum 3 is inserted into an opening 41 of the carrier element 4 and is connected rotationally conjointly to the drive gear 6, such that a rotational movement of the drive gear 6 leads to a rotational movement of the cable drum 3.

The drive housing 7 is mounted, with the interposition of a sealing element 5, onto the other, second side of the carrier element 4, and has a housing pot 70 with a bearing element 72 formed centrally therein, which bearing element is in the form of a cylindrical bearing dome which engages through an opening 62 of the drive gear 6 and thereby rotatably bears the drive gear 6. The housing pot 70 is adjoined by a worm housing 74, in which there is situated a drive worm 81 which is connected rotationally conjointly to a drive shaft 800 of an electric motor 80 of the motor unit 8 and which is in meshing engagement, by a worm toothing, with an external toothing 600 of a body 60 of the drive gear 6. The drive shaft 800 is borne, by means of a bearing 82 at its end averted from the electric motor 80, in the worm housing 74. Here, the electric motor 80 is situated in a motor pot 73 of the drive housing 7, which is closed off to the outside by means of a housing cover 75.

The drive housing 7 furthermore has an electronics housing 76 in which a circuit board 760 with control electronics arranged thereon is enclosed. The electronics housing 76 is closed off to the outside by means of a housing plate 761 with a plug connector 762 arranged thereon for the electrical connection of the electronics of the circuit board 760.

The drive gear 6 has, protruding axially from the body 60, a connecting gear 61 with an external toothing 610 formed thereon, which connecting gear engages with the internal gear 31 of the cable drum 3 such that an internal toothing 310 of the internal gear 31 (see, for example FIG. 1B) is in meshing engagement with the external toothing 610 of the connecting gear 61. In this way, the drive gear 6 and the cable drum 3 are connected rotationally conjointly to one another such that the cable drum 3 is rotatable on the carrier element 4 by driving the drive gear 6.

For the assembly of the drive apparatus 1, the cable exit housing 2 is mounted at one side onto the carrier element 4 and the drive housing 7 is mounted at the other side onto the carrier element 4. The fastening to the carrier element 4 is then performed by virtue of a fastening element 9 in the form of a screw element being inserted into an engagement opening 721 on the bottom side of the drive housing 7 such that the fastening element 9 extends through an opening 720 in the bearing element 72 of the drive housing 7 and engages centrally into an opening 221 within the bearing element 22 of the cable exit housing 2. By means of the fastening element 9, the cable exit housing 2 and the drive housing 7 are braced axially relative to one another on the bearing elements 22, 72 and are thereby fixed to the carrier element 4.

For the assembly process, the cable exit housing 2 is mounted onto the first side of the carrier element 4, such that the cable exit housing 2 encloses the cable drum 3 and holds the latter on the carrier element 4. Here, the cable exit housing 2, with its housing portions 21 spaced apart radially from the bearing element 22, comes into contact by way of foot portions 210 with a contact ring 45 which circumferentially surrounds an opening 41 in the carrier element 4. On the contact ring 45, there are formed axially protruding positive-locking elements 42 in the form of web-like pegs which, during the mounting of the cable exit housing 2 onto the carrier element 4, enter into engagement with positive-locking openings 212 (see, FIG. 2) on the foot portions 210 of the housing portions 21 and thereby realize a rotation-preventing securing action, about the axis of rotation D defined by the bearing element 22, between the cable exit housing 2 and the carrier element 4.

On the inner side of the positive-locking elements 42, there are formed detent recesses 420 (see, for example FIG. 3) into which detent elements 211 in the form of outwardly protruding detent lugs on the housing portions 21 engage when the cable exit housing 2 is mounted. By means of this detent connection, in a preassembly position, the cable exit housing 2 together with the cable drum 3 enclosed therein is held on the carrier element 4 even when the drive housing 7 has not yet been braced with the cable exit housing 2 by means of the fastening element 9. The detent connection thus simplifies the assembly process and prevents the cable exit housing 2 from falling off when the drive housing 7 has not yet been mounted.

In the preassembly position, the cable drum 3 comes to rest by means of radially protruding rest elements 32 on the upper edge of the internal gear 31 (see, for example FIG. 1A) on a rest ring 46 within the opening 41 of the carrier element 4, such that the cable drum 3, in the preassembly position, cannot slip through the opening 41 and is held by means of the cable exit housing 2 on the carrier element 4.

The rest elements 32 serve in particular for securing the position of the cable drum 3 on the carrier element 4 in the preassembly position. After the assembly of the drive apparatus 1 has been completed, the cable drum 3 is connected by means of the internal gear 31 to the drive gear 6, and is fixed axially between the cable exit housing 2 and the drive housing 7.

On the inner sides of the housing portions 21, there are arranged axially extending and radially inwardly protruding securing elements 23 which face toward the cable groove 300 on the shell surface of the body 30 and which may slide along said shell surface during operation. By means of these securing elements 23, it is ensured that the traction cable 10 received in the cable groove 300 cannot jump out of the cable groove 300.

The drive housing 7 is mounted onto the other, second side of the carrier element 4 such that the motor pot 73 comes to lie in a protuberance 44 in the surface portion 40 and the worm housing 74 comes to lie in a protuberance 440, which adjoins the former protuberance, in the surface portion 40 (see FIGS. 1A, 1B and 2). During the mounting of the drive housing 7, fastening devices 71 in the form of engagement bushings with positive-locking openings 710 formed therein enter into engagement with positive-locking elements 43 in the form of pegs which protrude at the bottom side from the carrier element 4. By virtue of the fact that the positive-locking openings 710 of the fastening devices 71 are spaced apart radially from the axis of rotation D created by the bearing element 72 of the drive housing 7 in exactly the same way as the positive-locking elements 43 in the form of the pegs on the carrier element 4, this positive-locking engagement causes the drive housing to be fixed in a rotationally fixed manner on the carrier element 4, such that a rotation-prevention securing action is provided for the drive housing 7.

On the positive-locking elements 43 of the carrier element 4, there are arranged engagement portions 51 on a sealing ring 50 of the sealing element 5, such that the positive-locking engagement of the positive-locking elements 43 with the positive-locking openings 710 on the fastening devices 71 is realized with the interposition of the engagement portions 51. This serves for acoustic decoupling.

On the sealing element 5, there is formed a curved portion 52 which comes to lie in the region of the protuberance 440 for receiving the worm housing 74. The curved portion 52 forms an intermediate layer between the worm housing 74 and the carrier element 4, such that acoustic decoupling of the drive housing 7 from the carrier element 4 is realized in this way too.

When the drive housing 7 has been mounted onto the carrier element 4 with the interposition of the sealing element 5, the drive housing 7 is braced together with the cable exit housing 2 by means of the fastening element 9, such that, in this way, the cable exit housing 2 and the drive housing 7 are fixed relative to one another and on the carrier element 4. As can be seen from FIGS. 1A and 1B, the fastening element 9 is inserted into the engagement opening 721 within the bearing element 72 of the drive housing 7, such that the fastening element 9 engages with a shank 90 through the opening 720 on the head of the bearing element 72 and engages into the opening 221 of the bearing element 22 of the cable exit housing 2. Here, a head 91 of the fastening element 9 comes to lie on that side of the opening 720 which is averted from the bearing element 22, such that, by screw connection of the fastening element 9 into the opening 221 within the bearing element 22, the cable exit housing 2 is braced relative to the drive housing 7. Here, bearing element 22 of the cable exit housing 2 and the bearing element 72 of the drive housing 7 create a common axis of rotation D for the cable drum 3, on the one hand, and the drive gear 6, on the other hand, such that the cable drum 3 and the drive gear 6 can, during operation, rotate coaxially with respect to one another and jointly with one another.

In the exemplary embodiment as per FIGS. 1A, 1B to 7A, 7B, the drive shaft 800 of the electric motor 80 is borne so as to be rotatable relative to the drive housing 7 about a shaft axis W. As can be seen from the sectional view as per FIG. 4B, the electric motor 80 is formed in this case by a stator 83, which, on pole teeth, bears a multiplicity of stator windings 830 (schematically indicated in FIG. 4B), and by a rotor 84, which bears a magnet arrangement 840 with a multiplicity of permanent magnet poles. The rotor 84 constitutes an external rotor and rotates radially outside the stator 83. The rotor 84 is connected rotationally conjointly to the drive shaft 800, which is borne, so as to be rotatable relative to the stator 83, in a bushing-like bearing element 85.

The electric motor 80 may, on its stator 83, have for example six, nine, twelve, fifteen, eighteen, twenty-one or twenty-four pole teeth with stator windings 830 arranged thereon. During the operation of the electric motor 80, the stator windings 830 are electrically energized in an electronically commutated manner such that a rotating field revolves at the stator 83. The rotating field interacts with an exciter field, generated by the magnet arrangement 840 (with for example four, six, eight, ten, twelve, fourteen or sixteen magnet poles) on the rotor 84, in order to generate a torque, such that the rotor 84 is set in rotational motion about the stator 83.

As can be seen from the sectional view in FIG. 4B, the shaft axis W extends obliquely relative to the axis of rotation D of the cable drum 3 and of the drive gear 6. This creates an additional degree of freedom in the arrangement of the electric motor 80 on the carrier element 4, which can contribute to a compact structural form of the drive apparatus 1.

Figure 8:
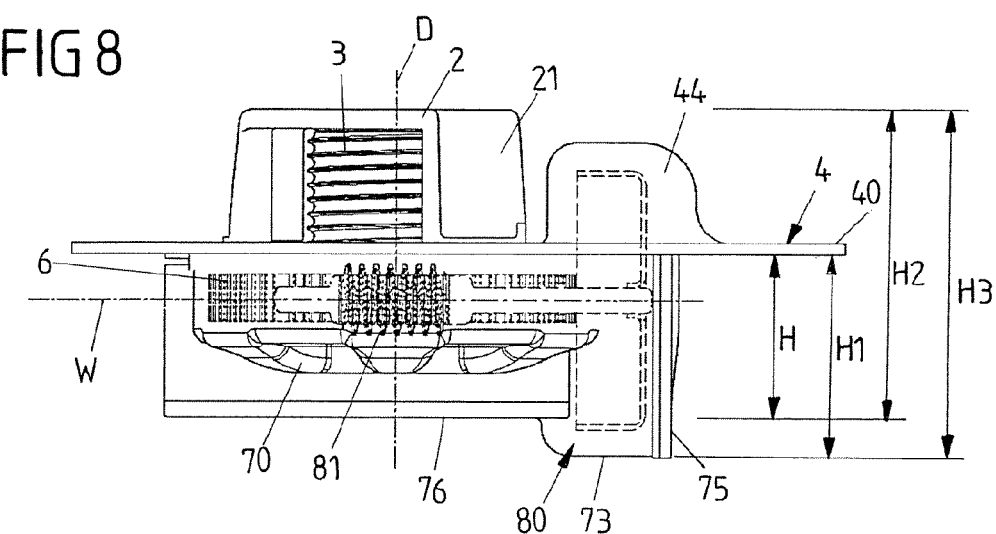
FIG. 8 shows a side view of the drive apparatus in the case of a conventional orientation of a shaft axis of a drive shaft.
Figure 9:
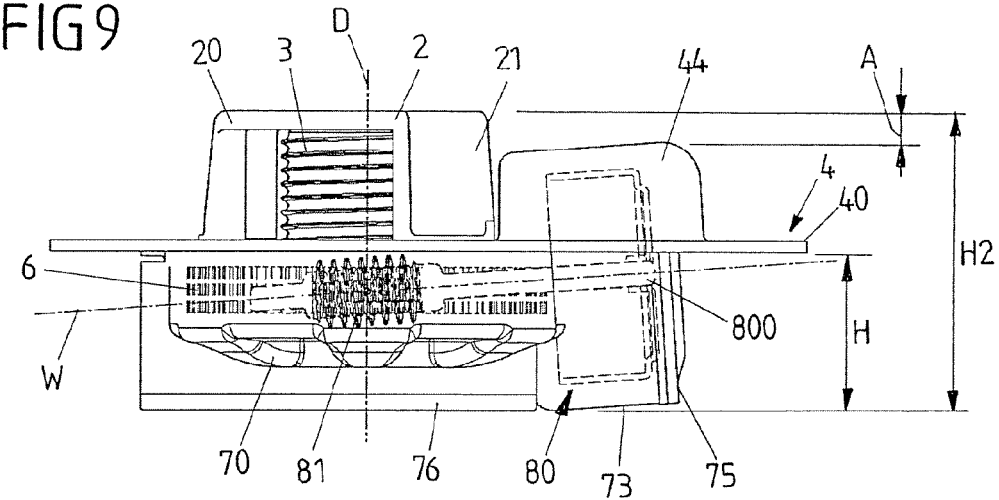
FIG. 9 shows a side view of the drive apparatus with an obliquely oriented shaft axis, as per a first variant.
Figure 10:
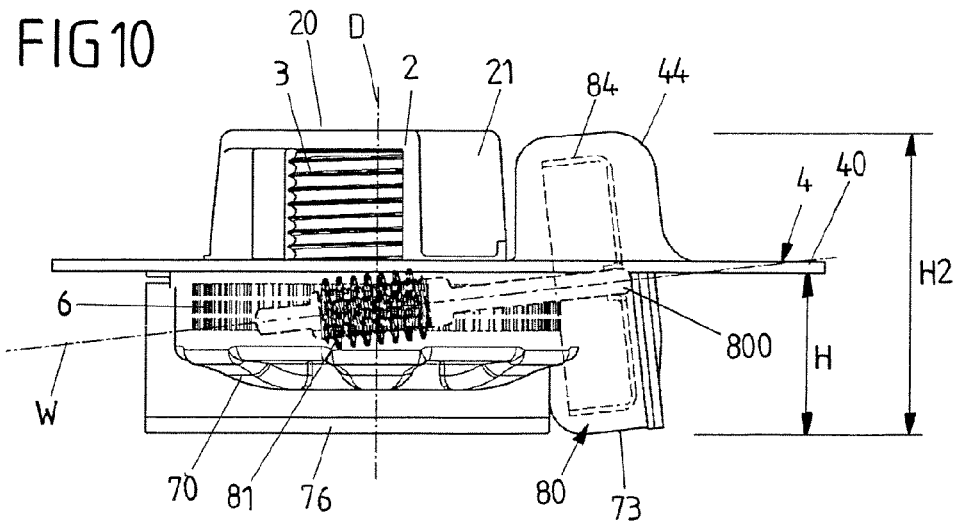
FIG. 10 shows a side view of the drive apparatus with an obliquely oriented shaft axis, as per a second variant.

This will be illustrated on the basis of FIGS. 8-10.

FIG. 8 shows a conventional arrangement, in which the shaft axis W extends transversely with respect to the axis of rotation D. Because the drive worm 81 is to be arranged at the same height as the drive gear 6, this has the effect that the electric motor 80 enclosed in the motor pot 73 has a relatively large height H1 at the second side of the carrier element 4, which determines the structural space at the second side of the carrier element 4. In particular, the height H1 of the motor pot 73 is greater than the height H of the electronics housing 76. This yields an overall height H3 of the drive apparatus 1 (measured across the drive housing 7 and the cable exit housing 2) which is greater than the height H2 measured across the electronics housing 76 and the cable exit housing 2.

If, as, in the variant as per FIG. 9, which corresponds to the exemplary embodiment as per FIGS. 1A, 1B to 7A, 7B, the shaft axis W extends at an oblique angle relative to the axis of rotation D, this makes it possible for the electric motor 80 to be relocated in the direction of the cable exit housing 2 such that the motor pot 73 does not project beyond the electronics housing 76 at the second side of the carrier element 4. The height of the motor pot 73 at the second side may thus correspond to the height H of the electronics housing 76, such that the motor pot 73 does not require any additional structural space (along the normal direction oriented perpendicular to the carrier element 4). The result is an overall height H2 of the drive apparatus 1 which is determined (exclusively) by the height of the cable exit housing 2 and of the electronics housing 76.

In the variant as per FIG. 9, there is a spacing A along the normal direction (perpendicular to the carrier element 4) between the upper edge of the protuberance 44 in which the motor pot 73 is situated and the upper edge of the base 20 of the cable exit housing 2. There is thus additional structural space that can be utilized for an increase of the diameter of the electric motor 80, as illustrated in FIG. 10.

Accordingly, the diameter of the electric motor 80, determined by the rotor 84 formed as an external rotor, can be increased such that the upper edge of the protuberance 44 lies at the same height as the top side of the base 20, and thus the total height of the structural space required for the electric motor 80 (determined by the height of the protuberance 44 at the first side of the carrier element 4 and the height H of the motor pot 73 at the second side of the carrier element 4) corresponds to the total height H2 of the cable exit housing 2 and of the electronics housing 76. Here, the increase of the rotor diameter 84 makes it possible for the axial length (viewed along the shaft axis W) of the electric motor 80 and of the drive shaft 800 to be reduced, such that the increase of the diameter makes it possible, while maintaining the same torque, to shorten the axial length of the electric motor 80.

The motor pot 73 that encloses the electric motor 80 is situated in the protuberance 44 on the carrier element 4. By virtue of the fact that the protuberance 44 extends into the space of the cable exit housing 2 at the first side of the carrier element 4 and, for this purpose, projects from the surface element 40, the motor pot 73 can figuratively speaking and as viewed from the second side, assigned to the drive housing 7, of the carrier element 4 be recessed into the carrier element 4. Together with the oblique orientation of the shaft axis W and the increase of the diameter of the electric motor 80, this permits a particularly compact structural form of the drive apparatus 1.

Figure 11:
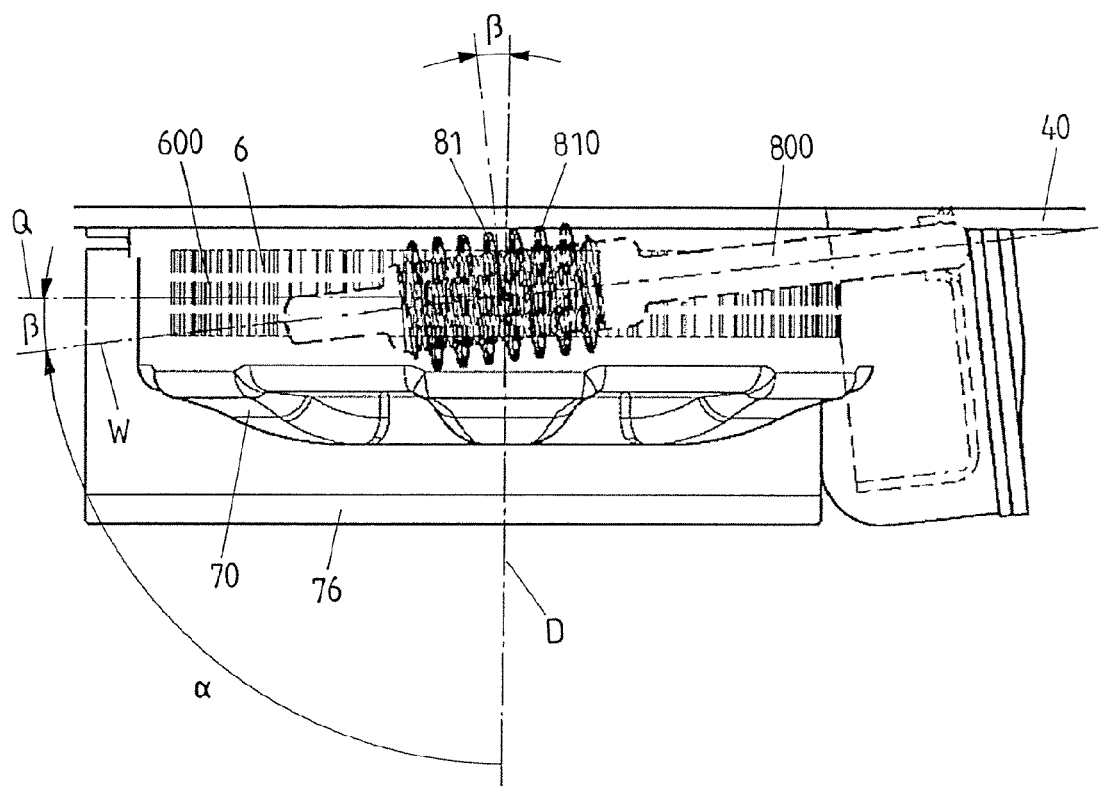
FIG. 11 shows an enlarged detail illustration of the arrangement as per FIG. 10.

In a particularly advantageous embodiment, the obliquity of the shaft axis W relative to the axis of rotation D may be selected specifically such that the pitch angle β of the worm toothing 810 of the drive worm 810 corresponds exactly to the angle described by the shaft axis W relative to a transverse axis Q pointing transversely with respect to the axis of rotation D, as illustrated in FIG. 11. This makes it possible for the external toothing 600 of the drive gear 6 to be formed as a straight toothing (with tooth tips extending in a straight manner parallel to the axis of rotation), which—in relation to a conventionally common oblique toothing—permits simple, inexpensive production of the drive gear 6. The obliquity of the shaft axis W can thus not only be advantageous for the structural space but can simultaneously also permit simple, inexpensive production of the drive gear 6.

As can be seen from FIG. 11, the shaft axis W describes an angle α relative to the axis of rotation D. The angle β corresponds to an absolute value of 90°−α.

The drive worm 81 may for example be formed in one piece with the drive shaft 800. It is however also conceivable and possible for the drive worm 81 to be arranged rotationally conjointly, as an additional, separate component, on the drive shaft 800.

FIGS. 13 to 21 show an exemplary embodiment of an electric motor 80 of the motor unit 8 for driving the drive gear 6 which is enclosed in the housing pot 70 and which is rotatably borne on the bearing element 72.

As already described above, the electric motor 80 has a stator 83 and a rotor 84 which rotates around the stator 83 and which is formed as an external rotor. The rotor 84 is connected to the drive shaft 800, on which the drive worm 81 for driving the drive gear 6 is arranged.

Figure 17:
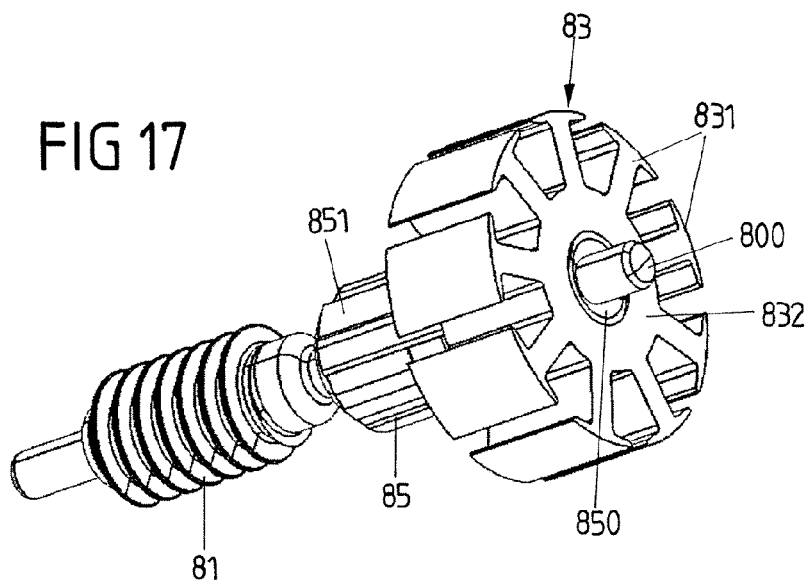
FIG. 17 shows a view of the motor unit without stator windings arranged on the stator.
Figure 18:
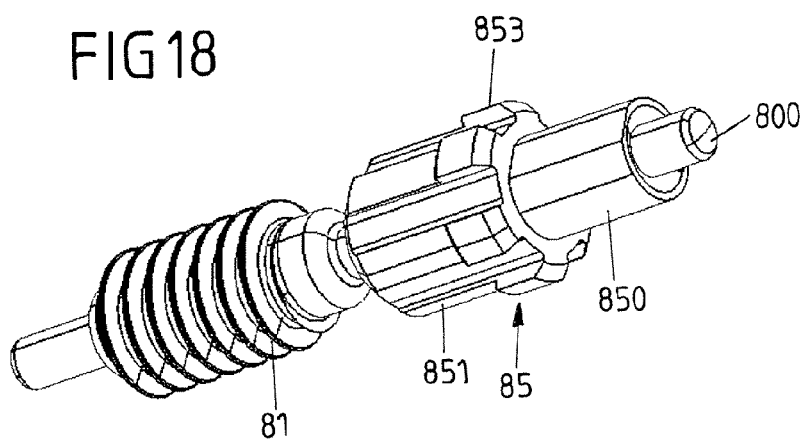
FIG. 18 shows a view of the drive shaft mounted in a bearing element.

As can be seen from FIGS. 15A, 15B and 17, the stator 83 has a stator body 832, which is formed for example as a laminated core by means of laminations mounted on one another, and forms a multiplicity of pole teeth 831 (nine pole teeth 831 in the exemplary embodiment). On the pole teeth 831, there are arranged stator windings 830, which in the exemplary embodiment illustrated are formed as concentrated windings. Here, on each pole tooth 831, there may be arranged one or more windings, which are manufactured by means of a winding wire, wound around the respectively associated pole tooth 831, with in each case multiple turns.

The stator 83 is connected fixedly to the drive housing 7 by means of a bearing element 85 by virtue of the bearing element 85 engaging with a first shank portion 850 centrally into the stator body 832 and being inserted with a second shank portion 851, which is offset axially relative to the first shank portion 850, into the worm housing 74 (see, for example FIG. 4B). By means of the bearing element 85, the stator 83 is fixedly connected to the drive housing 7, wherein the shank portions 850, 851 are fixed on the one hand in the stator body 832 and on the other hand in the worm housing 74 for example by pressing, adhesive bonding, welding or in some other way.

Figure 19A:
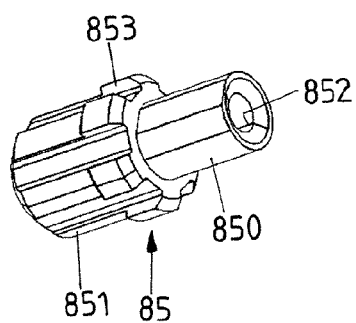
FIG. 19A shows a view of the bearing element which serves for bearing the drive shaft.
Figure 19B:
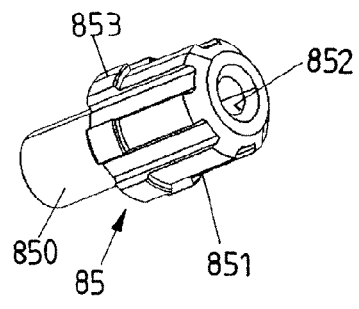
FIG. 19B shows another view of the bearing element.
Figure 20:
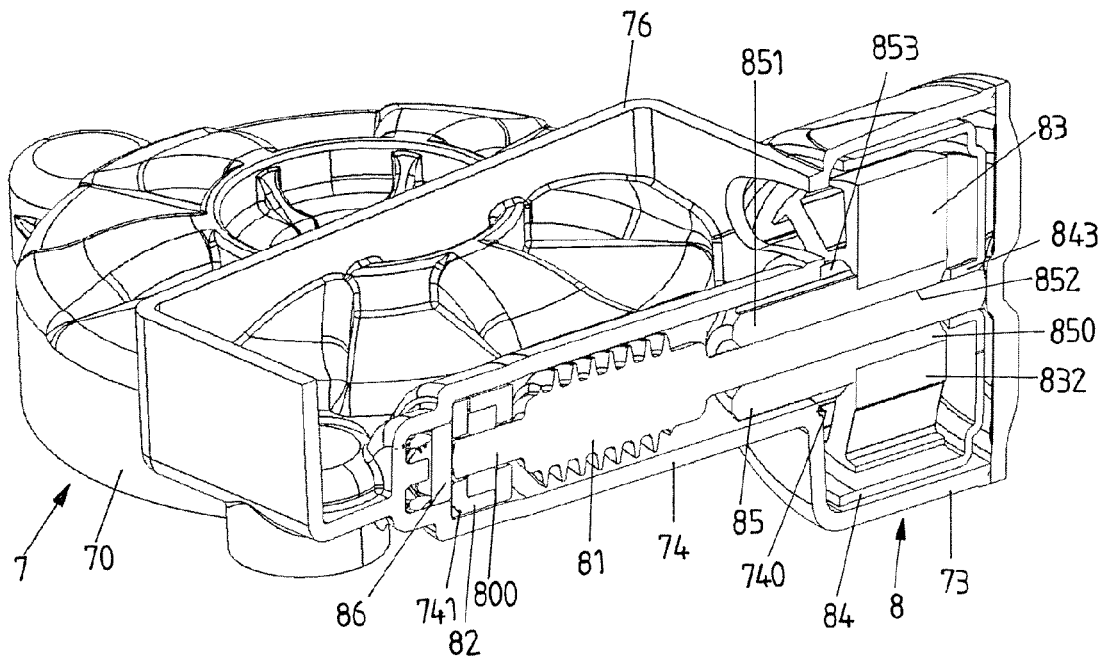
FIG. 20 shows a partially sectional view of the drive apparatus in the region of the motor unit.

As can be seen for example viewing FIG. 16 and FIGS. 19A, 19B together, the bearing element 85 has a central bearing opening 852 through which the drive shaft 800 engages. The drive shaft 800 is thus rotatably borne in the bearing element 85, wherein the drive shaft 800 is additionally supported at its end averted from the stator 83 by means of a bearing element 82 within the worm housing 74 (see, for example FIG. 4B).

The bearing element 85 may be produced for example from plastic, and may have advantageous sliding characteristics for bearing the drive shaft 800.

Figure 21:
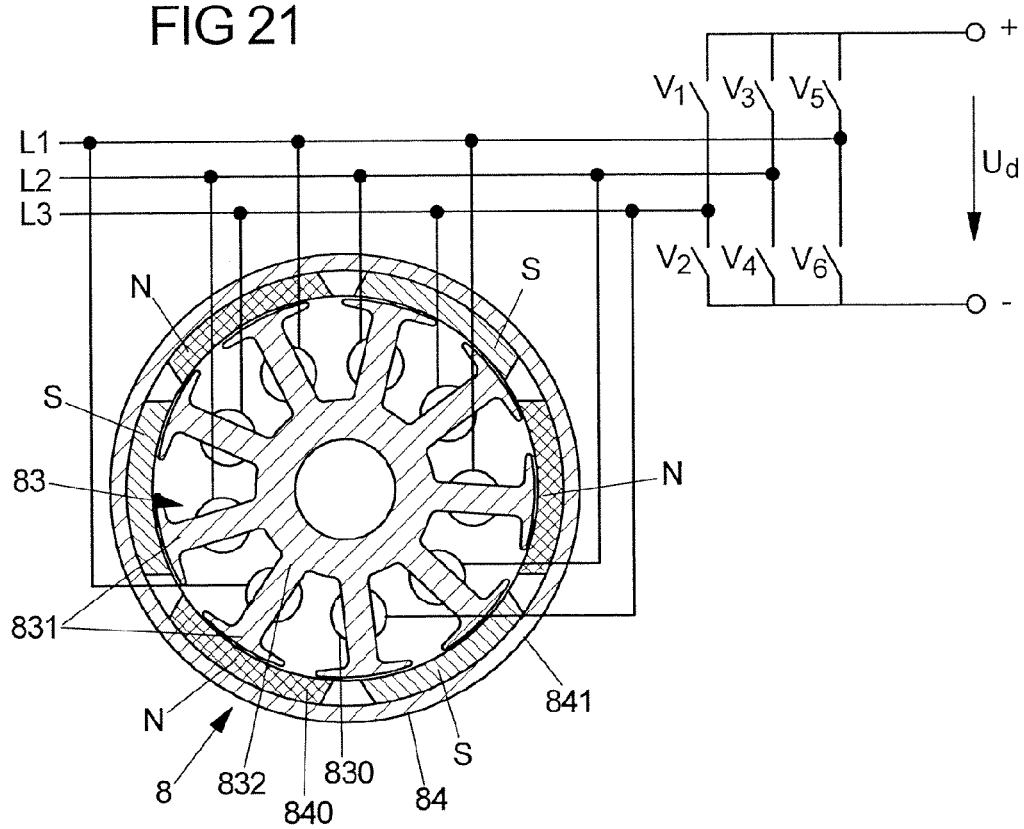
FIG. 21 shows a schematic view of the electric motor of the motor unit, with three-phase electrical energization of the stator windings arranged on the stator.
Figure 22:
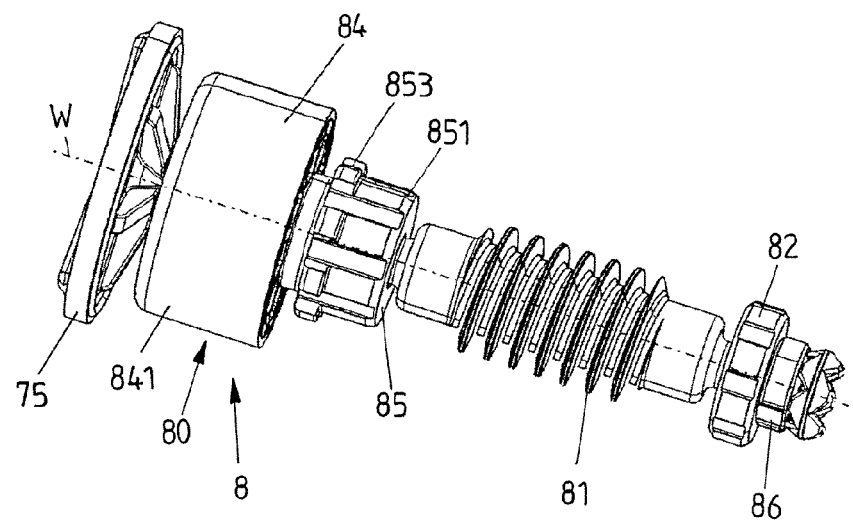
FIG. 22 shows a view of an exemplary embodiment of a motor unit.
Figure 23:
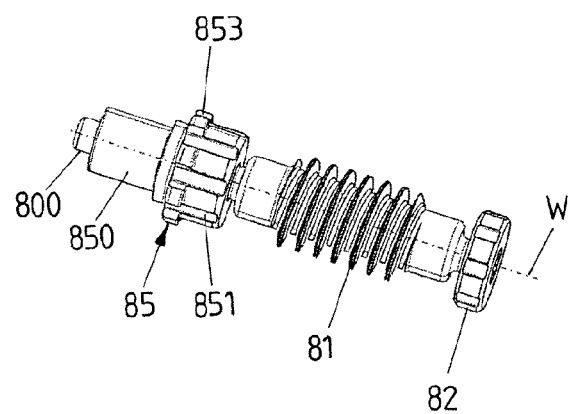
FIG. 23 shows a separate view of the drive shaft together with bearing elements which serve for bearing the drive shaft.
Figure 24:
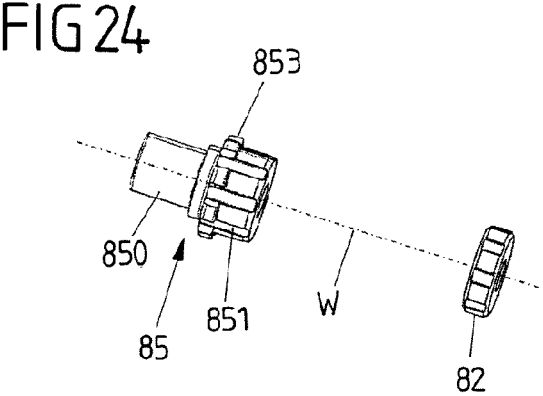
FIG. 24 shows a separate view of the bearing elements.

The rotor 84, which is formed as an external rotor, has a pole pot 841, which has a magnet arrangement 840 with a multiplicity of circumferential mutually offset magnet poles N, S, as is schematically illustrated in FIG. 21. The magnet arrangement 840 may be formed for example as an annular magnet with alternately magnetized (polarized) portions.

In the exemplary embodiment illustrated, the magnet arrangement 840 has six magnet poles N, S, as illustrated in FIG. 21, which are arranged alternately in relation to one another.

The pole pot 841 is connected by means of an end wall 842 to an end of the drive shaft 800 which is averted from the drive worm 81, as can be seen for example from FIG. 16 and FIG. 14B. The end wall 842 has, for this purpose, a connecting collar 843 into which the drive shaft 800 engages and by means of which the drive shaft 800 is thus fixed rotationally conjointly relative to the pole pot 841.

The pole pot 841 bears the magnet arrangement 840 on the inner side, facing toward the stator 83, of the circumferential shell surface. The pole pot 841 may be manufactured from a material with ferromagnetic characteristics, for example a metal material, and advantageously constitutes a magnetic feedback for the magnet arrangement 840.

Because the rotor 84 rotates around the stator 83 at the outside and the generation of torque thus occurs at a relatively large radius, the electric motor 80 has an advantageous torque characteristic. This makes it possible for the axial length of the electric motor 80 and of the drive shaft 800 to be reduced, and thus for the structural space of the motor unit 8 in an axial direction to be reduced.

It is pointed out at this juncture that the electric motor 80, as stated in the introduction, may also have some other number of pole teeth 831 on the stator 83 and magnet poles N, S on the rotor 84.

As is schematically illustrated in FIG. 21, the stator windings 830 on the pole teeth 831 of the rotor 83 are electrically energized in an electronically commutated manner during the operation of the drive apparatus 1. Here, by means of electronic switches V1-V6, a positive or negative potential is connected in alternating fashion to three phase lines L1, L2, L3 so as to generate a rotating field at the stator windings 830, which rotating field interacts with the exciter field, generated by the magnet arrangement 840 on the rotor 84, in order to generate torque on the rotor 84. The connection of the stator windings 830 may be realized here via the bearing element 85, via which lines may be led from, for example, the electronics housing 76 to the stator windings 830.

FIGS. 22 to 25 show an exemplary embodiment of a motor unit 8 which is slightly modified in relation to the exemplary embodiment as per FIGS. 13 to 21 and in the case of which an electric motor 80 has a rotor 84 which is formed as an external rotor and which rotates radially outside a stator 83. The rotor 84 has a pole pot 841, which is fixedly connected to a drive shaft 800, such that, by rotation of the rotor 84, the drive shaft 800 is set in rotational motion and drives the drive gear 6 via a drive worm 81 which is arranged on the drive shaft 800 (and which is for example formed integrally with the drive shaft 800).

In the exemplary embodiments as per FIGS. 13 to 21 and as per FIGS. 22 to 25, the drive shaft 800 is borne in each case by means of two bearing elements 82, 85 relative to the drive housing 7, specifically relative to the worm housing 74. Here, the bearing elements 82, 85 provide a rotatable bearing about the shaft axis W for the drive shaft 800. Said shaft axis W corresponds to the axis of rotation of the rotor 84.

As described above on the basis of the exemplary embodiment as per FIGS. 13 to 21, it is also the case in the exemplary embodiment as per FIGS. 22 to 25 that the bearing element 85 serves, in a synergistic dual function, for fixing the stator 83 relative to the worm housing 74 and also for bearing the drive shaft 800. Here, the bearing element 85 may include, at its shank portion 851 which engages into the worm housing 74, the same outer diameter as the further, second bearing element 82. In the case of an inner diameter which is constant along the length of the worm housing 74, the bearing elements 82, 85 are thus subject to similar tolerances within the worm housing 74.

The second bearing element 85, which bears the stator 83, has a stop 853 which is formed by individual projections which are circumferentially offset relative to one another, which stop, when the bearing element 85 engages into the worm housing 74, is in contact with a shoulder 740 at the entrance of the worm housing 74, such that the axial position of the bearing element 85 relative to the worm housing 74 is set by means of the stop 853.

By contrast, the further, second bearing element 82 bears, within the worm housing 74, against a shoulder 741 which is formed at a transition to an end portion 742 of the worm housing 74 (with an inner diameter reduced in relation to that portion of the worm housing 74 which receives the drive worm 81), such that the further, second bearing element 82 is also supported axially within the worm housing 74 and thus assumes a defined axial position within the worm housing 74.

The drive shaft 800 is, at its end assigned to the further, second bearing element 82, supported axially in the worm housing 74 via an abutment element 86 which lies in the end portion 742 of the worm housing 74. The abutment element 86 provides an axial bearing for the drive worm 800.

Figure 25:
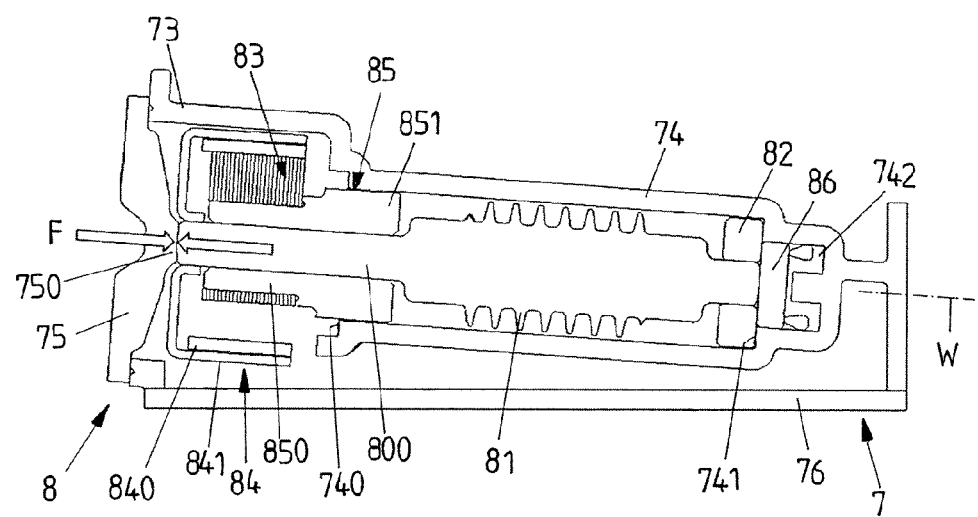
FIG. 25 shows a sectional view through the motor unit in the drive housing.

By contrast, at its other end, the drive shaft 800 is supported axially on the cover 75, which is connected to the motor pot 73, of the drive housing 7, wherein, for this purpose, the cover 75 has an abutment point 750 projecting toward the drive shaft 800, which abutment point provides a defined axial abutment for the drive shaft 800 (see, in particular FIG. 25). It is thus possible for axial forces of the drive shaft 800 to be accommodated on the cover 75, such that, by means of the axial support of the drive shaft 800 at both sides, a substantially play-free axial bearing for the drive shaft 800 within the worm housing 74 and the adjoining motor pot 73 can be provided.

The cover 75 may for example be welded to the motor pot 73, wherein the welding may be performed with the cover 75 being braced relative to the motor pot 73, such that an elimination of play of the drive shaft 800 in the drive housing 7 can be realized during the assembly process.

The concept on which the invention is based is not restricted to the exemplary embodiments discussed above, but rather may basically also be realized in a very different manner.

A drive apparatus of the type described is in particular not restricted to use on a window lifter, but rather may also serve for adjusting some other adjustable element, for example a sliding roof or the like, in a vehicle.

The drive apparatus can be assembled easily, in particular using one (single) axially bracing fastening element. An assembly process with few assembly steps is realized, which may be simple and expedient with reliable fixing of the cable exit housing and of the drive housing to the carrier element.

LIST OF REFERENCE DESIGNATIONS

1 Drive apparatus
10 Cable
11 Guide rail
110, 111 Diverting means
12 Driver
13 Window pane
2 Cable exit housing
20 Base
200, 201 Structural element (stiffening rib)
202 Aperture (material weakening)
21 Housing portion
210 Foot portion
211 Detent element
212 Positive-locking opening (slot opening)
22 Bearing element (bearing dome)
220 Centering cone
221 Opening
23 Securing element
3 Cable drum
30 Body
300 Cable groove
31 Internal gear
310 Toothing
32 Rest element
4 Carrier element (assembly carrier)
40 Surface portion
41 Opening
42 Positive-locking element
420 Detent recess
43 Positive-locking element
44 Protuberance
440 Protuberance
45 Contact ring
46 Rest ring
5 Sealing element
50 Sealing ring
51 Engagement portion
52 Curved portion
6 Drive gear
60 Body
600 External toothing
61 Connecting gear
610 Toothing
62 Opening
7 Drive housing
70 Housing pot
71 Fastening device (engagement bushing)
710 Positive-locking opening
72 Bearing element (bearing dome)
720 Opening
721 Engagement opening
722 Centering engagement
73 Motor pot
74 Worm housing
740, 741 Shoulder
742 End portion
75 Housing cover
750 Abutment point
76 Electronics housing
760 Circuit board
761 Housing plate
762 Plug connector
8 Motor unit
80 Electric motor
800 Drive shaft
81 Drive worm
810 Worm toothing
82 Bearing
820 Stop
83 Stator
830 Stator windings
831 Pole teeth
832 Stator body
84 Rotor
840 Magnet arrangement (annular magnet)
841 Pole pot
842 End wall
843 Connecting collar
85 Bearing element
850, 851 Shank portion
852 Bearing opening
853 Stop
86 Abutment element
9 Fastening element
90 Shank
91 Head
α, β Angle
A Spacing
D Axis of rotation
H, H1, H2 Height
Q Transverse axis
V1-V6 Electronic switches
W Shaft axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drive apparatus, for adjusting a covering element of a vehicle, including a window lifter device, the drive apparatus comprising:
an output element for adjusting the covering element;
a motor unit provided with an electric motor including a stator, a rotor, and a drive shaft connected to the rotor and rotatable about a shaft axis to drive the output element; and
a drive housing at least partially enclosing the motor unit and including a worm housing portion and a static housing portion, wherein the stator is connected to the static housing portion by a first bearing element, the first bearing element directly connected to the stator and extending into and engaging the worm housing, wherein the first bearing element has a bearing opening in which the drive shaft is borne so as to be rotatable relative to the stator;
a drive gear operatively connected to the output element and in meshing engagement with the drive shaft; and
a drive worm provided with a worm toothing and arranged on the drive shaft, wherein the worm toothing is in meshing engagement with a toothing of the drive gear, wherein the drive worm is enclosed in the worm housing, and wherein the first bearing element is directly connected to the worm housing by a press fit, welding, or gluing.

2. The drive apparatus of claim 1, wherein the first bearing element has a first shank portion, fixedly connected to a stator body of the stator, and a second shank portion, wherein the second shank portion is offset axially relative to the first shank portion and fixedly connected to the housing portion.

3. The drive apparatus of claim 1, wherein the rotor is an external rotor configured to rotate radially outside the stator about the shaft axis.

4. The drive apparatus of claim 1, wherein the electric motor is a brushless DC motor.

5. The drive apparatus of claim 1, wherein the stator includes a plurality of pole teeth and a plurality of stator windings, wherein the plurality of stator windings are disposed on the plurality of pole teeth.

6. The drive apparatus of claim 1, wherein the rotor includes a magnet arrangement provided with a plurality of magnet poles.

7. The drive apparatus of claim 6, wherein in the rotor includes a pole pot connected to the drive shaft, wherein the magnet arrangement is disposed on the pole pot.

8. The drive apparatus of claim 1, wherein the rotor is connected to a first end of the drive shaft on a side of the stator averted from the drive worm.

9. The drive apparatus of claim 1, wherein the worm housing includes a first shoulder and wherein the first shoulder axially supports the first bearing element.

10. The drive apparatus of claim 1, further comprising a second bearing element, axially offset with respect to the first bearing element, wherein the first bearing element and the second bearing element are each arranged in the worm housing and are configured to mount the drive shaft such that the drive shaft is rotatable.

11. The drive apparatus of claim 10, wherein the second bearing element is supported axially on a second shoulder of the worm housing.

12. The drive apparatus of claim 11, further comprising an abutment element disposed in the worm housing, wherein the abutment element axially supports one end of the drive shaft.

13. The drive apparatus of claim 1, wherein the rotor and the stator are each enclosed in a motor pot of the drive housing, wherein the motor pot includes a cover and wherein the drive shaft is axially supported by the cover.

14. The drive apparatus of claim 1, wherein the shaft axis of the drive shaft is oriented at an oblique angle relative to an axis of rotation of the output element.

15. The drive apparatus of claim 1, wherein the output element is a cable drum rotatable about an axis of rotation and configured to adjust a traction element operatively connected to the covering element and arranged at a first side of a carrier element, wherein the drive housing is arranged on a second side of the carrier element, opposite the first side.

16. The drive apparatus of claim 1, wherein first bearing element is connected to the worm housing by the press fit.

17. The drive apparatus of claim 1, wherein first bearing element is connected to the worm housing by the welding.

18. The drive apparatus of claim 1, wherein first bearing element is connected to the worm housing by the gluing.

19. The drive apparatus of claim 1, wherein the first bearing element is connected to the worm housing by the press fit and the gluing.

20. The drive apparatus of claim 1, wherein the first bearing element is connected to the worm housing by the press fit and the welding.

* * * * *